United States Patent
Surtani et al.

(10) Patent No.: US 10,187,463 B2
(45) Date of Patent: *Jan. 22, 2019

(54) USING A SHARED DATA STORE FOR PEER DISCOVERY

(71) Applicant: Red Hat, Inc., Raleigh, NC (US)

(72) Inventors: Manik Surtani, San Francisco, CA (US); Bela Ban, Kreuzlingen (CH)

(73) Assignee: Red Hat, Inc., Raleigh, NC (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/634,551

(22) Filed: Jun. 27, 2017

(65) Prior Publication Data

US 2017/0295228 A1  Oct. 12, 2017

Related U.S. Application Data

(63) Continuation of application No. 13/037,256, filed on Feb. 28, 2011, now Pat. No. 9,712,340.

(51) Int. Cl.
  *H04L 29/08* (2006.01)
  *H04L 12/18* (2006.01)
  (Continued)

(52) U.S. Cl.
  CPC .......... *H04L 67/1061* (2013.01); *H04L 12/18* (2013.01); *H04L 12/6418* (2013.01);
  (Continued)

(58) Field of Classification Search
  CPC .............. H04L 67/1061; H04L 67/1097; H04L 67/146; H04L 12/18; H04L 67/104; G06F 17/30312; G06F 17/30887
  See application file for complete search history.

(56) References Cited

U.S. PATENT DOCUMENTS

2002/0129218 A1* 9/2002 Cox ................... H04L 29/12801
  711/200
2002/0184310 A1* 12/2002 Traversat .............. G06F 9/4416
  709/204

(Continued)

OTHER PUBLICATIONS

USPTO, Office Action for U.S. Appl. No. 13/037,256, dated Dec. 17, 2012.

(Continued)

*Primary Examiner* — Abdullahi E Salad
(74) *Attorney, Agent, or Firm* — Lowenstein Sandler LLP

(57) ABSTRACT

An example method includes: identifying, by a new node, an address of a shared data store comprising information on a current membership in a peer-to-peer system, wherein the shared data store is shared by a plurality of nodes that are current members of the peer-to-peer system, wherein the shared data store is a container for storing data in a storage cloud; sending, by the new node, a first message comprising an address of the new node to the shared data store; requesting, by the new node, at least one membership data structure from the shared data store; receiving, by the new node, a second message comprising the at least one membership data structure; generating, by the new node, a new membership data structure comprising the address of the new node and the plurality of addresses for the plurality of nodes identified in the at least one membership data structure; sending, by the new node, a third message comprising the new membership data structure to the shared data store; and joining, by the new node, the peer-to-peer system, wherein the joining comprises using the new membership data structure to identify nodes of the plurality of nodes to receive a plurality of messages from the new node.

20 Claims, 5 Drawing Sheets

(51) Int. Cl.
*H04L 12/64* (2006.01)
*G06F 17/30* (2006.01)

(52) U.S. Cl.
CPC ...... *H04L 67/1046* (2013.01); *H04L 67/1097* (2013.01); *H04L 67/146* (2013.01); *G06F 17/30312* (2013.01); *G06F 17/30887* (2013.01)

(56) References Cited

U.S. PATENT DOCUMENTS

| | | | |
|---|---|---|---|
| 2003/0023896 A1 | 1/2003 | Kashyap | |
| 2003/0041141 A1* | 2/2003 | Abdelaziz | G06F 9/4416 709/223 |
| 2003/0182428 A1 | 9/2003 | Li et al. | |
| 2005/0080858 A1 | 4/2005 | Pessach | |
| 2005/0086300 A1* | 4/2005 | Yeager | G06F 9/544 709/204 |
| 2005/0213531 A1* | 9/2005 | Nanda | H04L 45/04 370/328 |
| 2005/0262238 A1* | 11/2005 | Reeves | H04L 29/12066 709/224 |
| 2006/0259624 A1* | 11/2006 | Hu | H04L 61/2015 709/226 |
| 2007/0204061 A1* | 8/2007 | Chen | H04L 45/04 709/238 |
| 2008/0133445 A1* | 6/2008 | Pennington | G06F 17/30864 |
| 2008/0288580 A1* | 11/2008 | Wang | H04L 29/12509 709/203 |
| 2009/0245277 A1 | 10/2009 | Kawada et al. | |
| 2009/0252134 A1* | 10/2009 | Schlicht | H04L 1/0015 370/338 |
| 2009/0288138 A1 | 11/2009 | Kalofonos | |
| 2010/0023606 A1 | 1/2010 | Gerdes et al. | |
| 2010/0122305 A1 | 5/2010 | Moloney | |
| 2010/0169442 A1 | 7/2010 | Liu et al. | |
| 2010/0191919 A1 | 7/2010 | Bernstein et al. | |
| 2010/0268764 A1 | 10/2010 | Wee et al. | |
| 2010/0333116 A1 | 12/2010 | Prahlad et al. | |
| 2011/0307617 A1 | 12/2011 | Wu et al. | |
| 2012/0136936 A1 | 5/2012 | Quintuna | |
| 2012/0236936 A1* | 9/2012 | Segall | H04N 19/105 375/240.08 |

OTHER PUBLICATIONS

USPTO, Final Office Action for U.S. Appl. No. 13/037,256, dated Apr. 22, 2013.
USPTO, Office Action for U.S. Appl. No. 13/037,256, dated Jul. 31, 2013.
USPTO, Final Office Action for U.S. Appl. No. 13/037,256, dated Jan. 22, 2014.
USPTO, Office Action for U.S. Appl. No. 13/037,256, dated Jun. 19, 2014.
USPTO, Final Office Action for U.S. Appl. No. 13/037,256, dated Jan. 2, 2015.
USPTO, Office Action for U.S. Appl. No. 13/037,256, dated Feb. 1, 2016.
USPTO, Final Office Action for U.S. Appl. No. 13/037,256, dated Aug. 25, 2016.
USPTO, Advisory Action for U.S. Appl. No. 13/037,256, dated Jun. 27, 2013.
USPTO, Advisory Action for U.S. Appl. No. 13/037,256, dated Apr. 14, 2014.
USPTO, Notice of Allowance for U.S. Appl. No. 13/037,256, dated Mar. 15, 2017.

* cited by examiner

USING A SHARED DATA STORE FOR PEER DISCOVERY

RELATED APPLICATIONS

This application is a continuation of U.S. patent application Ser. No. 13/037,256 filed on Feb. 28, 2011, the entire content of which is incorporated by reference herein.

TECHNICAL FIELD

Embodiments of the present invention relate to peer-to-peer systems, and more specifically to peer discovery in a peer-to-peer system.

BACKGROUND

A peer-to-peer system is a distributed service architecture in which resources such as processing power, memory, disk storage, network bandwidth, etc. are partitioned and divided among peers. Each peer in a peer-to-peer system may be both a consumer and supplier of resources.

Peer-to-peer systems provide mechanisms for peer discovery to enable nodes to join the peer-to-peer system. One conventional mechanism for peer discovery is the use of a static list. The static list is a list of nodes in the peer-to-peer system. A new node uses the network addresses of nodes in the static list to determine system membership. Static lists provide a very fast discovery. However, static lists do not work well when membership in the peer-to-peer system is dynamic. Additionally, static lists are cumbersome for large numbers of nodes.

Due to the limitations of static lists, most peer-to-peer systems use user datagram protocol (UDP) multicast to perform peer discovery. Multicast is the delivery of a message or data to multiple destination computing devices simultaneously in a single transmission. With multicast, as a node joins a peer-to-peer system, the node announces its address to existing nodes in the peer-to-peer system. The nodes (each of which is a peer in the peer-to-peer system) then respond by sending their addresses to the new node. Multicast enables peer discovery in a peer-to-peer system that has a dynamic membership. However, multicast can require multiple round trip messages to perform discovery. Additionally, many cloud computing platforms (e.g., Amazon® Elastic Compute Cloud (EC2), Rackspace® Cloud, etc.) do not permit multicasts. Therefore, peer-to-peer systems running on cloud computing platforms often cannot use multicast for peer discovery.

BRIEF DESCRIPTION OF THE DRAWINGS

The present invention is illustrated by way of example, and not by way of limitation, in the figures of the accompanying drawings and in which.

DETAILED DESCRIPTION

Described herein are a method and apparatus for using a shared data store to perform peer discovery for a peer-to-peer system. In one embodiment, after acquiring a network address a machine accesses a shared data store and writes the network address to the shared data store. The computing device additionally reads other network addresses from the shared data store. Each network address in the shared data store may be for a member node (peer) of a peer-to-peer system. Accordingly, the machine may determine group membership of the peer-to-peer system based on the contents of the shared data store. The computing device then joins the peer-to-peer system. This may include exchanging messages with one or more of the existing member nodes in the peer-to-peer system using their network addresses.

Embodiments of the present invention enable machines to perform shared data store based peer discovery in a peer-to-peer system that has dynamic membership. Shared data store based peer discovery may be used for peer-to-peer systems that operate on cloud computing platforms that prohibit multicast (e.g., Amazon EC2 and Rackspace Cloud). Additionally, unlike static list peer discovery, shared data store based peer discovery can be used for peer-to-peer systems that have dynamic membership.

Figure 1:
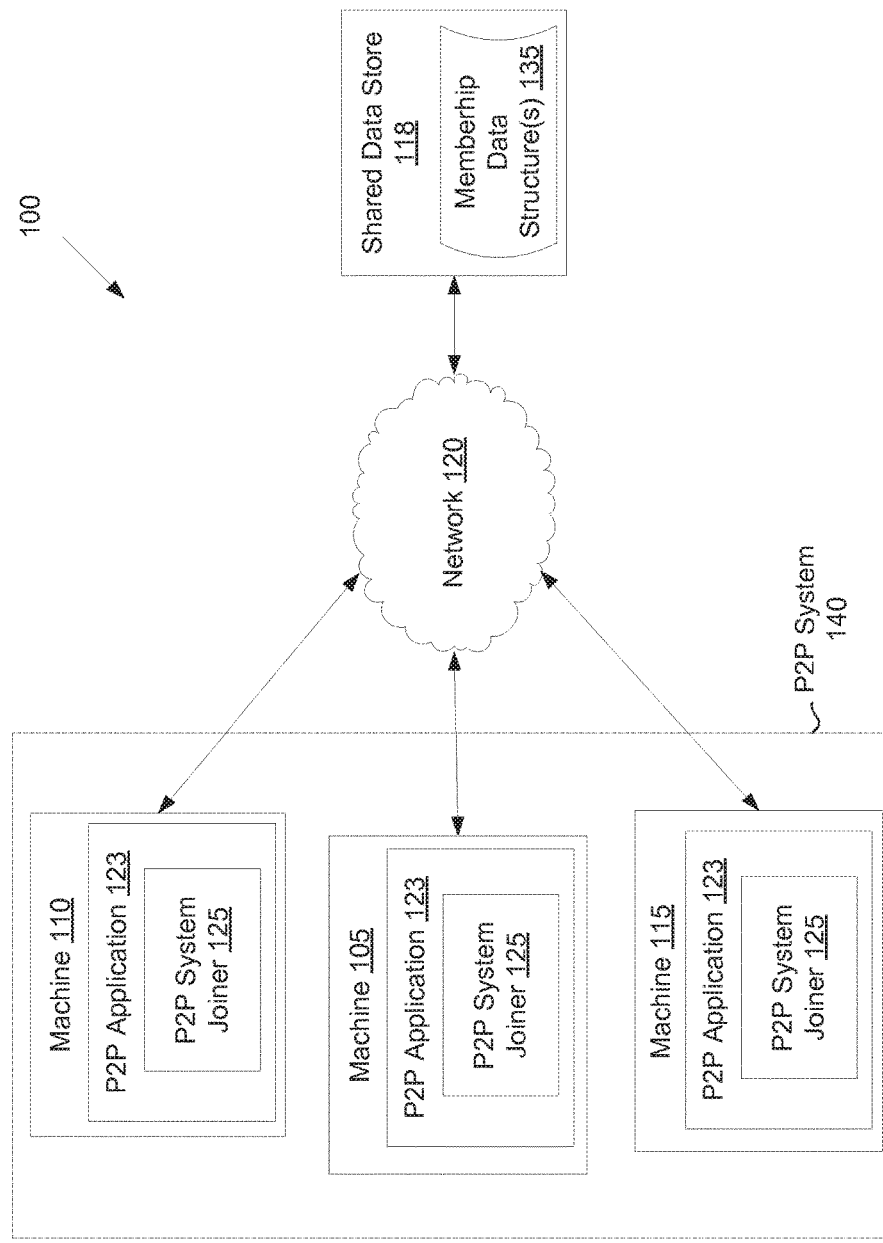
FIG. 1 illustrates an exemplary peer-to-peer network architecture, in which embodiments of the present invention may operate.

FIG. 1 illustrates an exemplary peer-to-peer network architecture 100, in which embodiments of the present invention may operate. The peer-to-peer network architecture 100 includes multiple machines 105, 110, 115 connected via a network 120. The network 120 may be a public network (e.g., Internet), a private network (e.g., a local area Network (LAN)), or a combination thereof.

Machines 105, 110, 115 may be hardware machines such as desktop computers, laptop computers, servers, or other computing devices. Additionally, machines 105, 110, 115 may also be hardware machines such as routers, switches, gateways, storage servers, or other network attached devices. Each of the machines 105, 110, 115 may include an operating system that manages an allocation of resources of the computing device (e.g., by allocating memory, prioritizing system requests, controlling input and output devices, managing file systems, facilitating networking, etc.). In one embodiment, one or more of the machines 105, 110, 115 is a virtual machine. For example, machines 105 may be a virtual machine provided by Amazon EC2. In some instances, some machines may be virtual machines running on the same computing device (e.g., sharing the same underlying hardware resources).

Each of the machines 105, 110, 115 includes a peer-to-peer (P2P) application 123 that runs on the machine. The peer-to-peer application may be a file sharing application, grid computing application, distributed data grid application, distributed search application, or any other type of application that uses a clustering protocol. The peer-to-peer applications 123 may communicate via the network 120 to form a peer-to-peer system 140. The peer-to-peer system 140 may be a peer-to-peer file sharing system, a distributed computing grid, a distributed data grid, a computing cluster, or other type of peer-to-peer system.

In one embodiment, the peer-to-peer system 140 provides one or more services that clients and/or peers can access. A service is a discretely defined set of contiguous and autonomous functionality (e.g., business functionality, technical functionality, etc.). A service may represent a process, activity or other resource that can be accessed and used by other services or clients (not shown) on network 120. In one embodiment, peers of the P2P system 140 can access the service provided by the P2P system 140. In another embodiment, the P2P system 140 acts as a distributed server, and clients may connect to any of the machines 105, 110, 115 in the P2P system 140 to access the service. For example, the P2P system 140 may be a distributed data grid that provides a distributed cache to a client such as a web application.

To join the P2P system 140, a machine initially performs peer discovery to find other nodes (e.g., machines) that are members in the peer-to-peer system 140. In one embodiment, the P2P application 123 includes a peer-to-peer (P2P) system joiner 125 that performs peer discovery and tracks group membership. In one embodiment, P2P system joiner 125 is preconfigured with a network address for a shared data store 118 that contains network addresses for current members of the P2P system 140.

Shared data store 118 is a network-available storage connected to network 120. Shared storage 118 may include volatile storage (e.g., memory), non-volatile storage (e.g., disk storage), or a combination of both. In one embodiment, the shared data store 118 is a network storage device managed by a storage server. For example, the shared data store 118 may be a storage area network (SAN), a network attached storage (NAS), or a combination of both. The shared data store 118 may be a shared folder or directory within a network storage device. If the shared data store is a network storage device, P2P system joiner 125 may access the shared data store 118 using a storage network communication protocol such as internal small computer interface (iSCSI), common internet file system (CIFS), network file system (NFS), direct access file systems (OAFS), and so on.

In another embodiment, shared data store 118 is a container in a storage cloud. Some examples of storage clouds include Amazon's® Simple Storage Service (S3), Nirvanix® Storage Delivery Network (SON), Windows® Live SkyDrive, Ironmountain's® storage cloud, Rackspace® Cloudfiles, AT&T® Synaptic Storage as a Service, Zetta® Enterprise Cloud Storage On Demand, IBM® Smart Business Storage Cloud, and Mosso® Cloud Files. Most storage clouds provide unlimited storage through a simple web services interface (e.g., using standard HTTP commands or SOAP commands). However, most storage clouds are not capable of being interfaced using standard file system protocols. Accordingly, if the shared data store 118 is a container in a storage cloud, P2P system joiner 125 may access shared data store 118 using cloud storage protocols such as hypertext transfer protocol (HTTP), hypertext transport protocol over secure socket layer (HTTPS), simple object access protocol (SOAP), representational state transfer (REST), etc. Thus, P2P system joiner 125 may store data in the shared data store 118 using, for example, common HTTP POST or PUT commands, and may retrieve data using HTTP GET commands.

In one embodiment, shared data store 118 is encrypted and/or protected by an authentication mechanism to ensure that only authenticated machines can join the peer-to-peer system. Accordingly, P2P system joiner 125 may be challenged to provide authentication credentials (e.g., a login and password, a secure sockets layer (SSL) certificate, etc.) before gaining access to the shared data store 118. Alternatively, shared data store 118 may be public, so that any machine can join the peer-to-peer system 140.

Shared data store 118 holds one or more membership data structures 135. A membership data structure 135 may be a file, database, table, list or other data structure. In one embodiment, shared data store 118 includes a separate membership data structure (e.g., a separate file such as a text file, XML file, etc.) for each node that is a member of the P2P system 140. Alternatively, shared data store 118 may include a single membership data structure (or a few membership data structures) that contains multiple entries, where each entry corresponds to a separate member node. In one embodiment, each entry includes an address of a particular member node. The address may include an internet protocol (IP) address and a port number. For example, the address may be a tuple (/P address, port number) that enables the P2P application 123 to communicate with other nodes in the P2P system 140.

In one embodiment, each machine 105, 110, 115 that joins P2P system 140 accesses shared data store 118 and writes the machine's network address to the shared data store 118 (e.g., by adding an entry to an existing membership data structure 135 or adding a new membership data structure 135). In addition to writing to the shared data store 118, a P2P system joiner 125 may read the one or more membership data structures 135 in the shared data store 118 to identify network addresses of the member nodes in the peer-to-peer system 140. Once a P2P application 123 has the network addresses of the other nodes in the P2P system 140, and those other nodes have the network address of the P2P application 123 and/or its host machine, that P2P application 123 has joined the P2P system 140.

Figure 2:
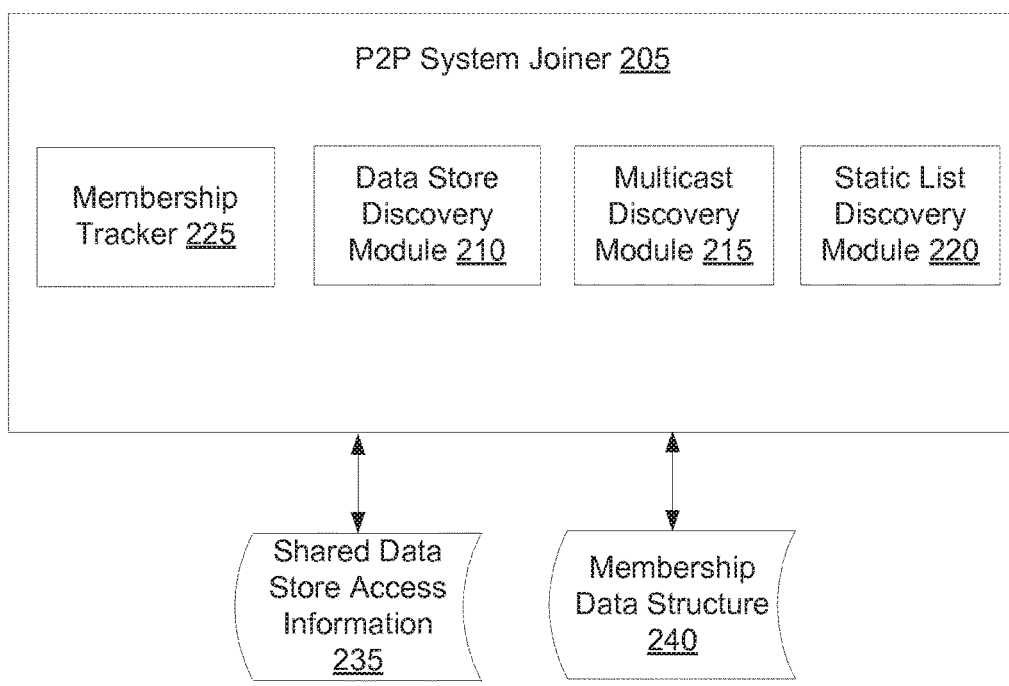
FIG. 2 illustrates a block diagram of a peer-to-peer system joiner for a node in a peer-to-peer system, in accordance with one embodiment of the present invention.

FIG. 2 illustrates a block diagram of a P2P system joiner 205 for a node in a peer-to-peer system, in accordance with one embodiment of the present invention. In one embodiment, the P2P system joiner 205 corresponds to P2P system joiner 125 of FIG. 1. The P2P system joiner 205 may be installed on each machine (e.g., each hardware machine and each virtual machine) that will participate in a peer-to-peer system.

P2P system joiner 205 joins a peer-to-peer system and tracks P2P system membership for a peer-to-peer application. In one embodiment, P2P system joiner 205 includes a data store discovery module 210, a multicast discovery module 215, a static list discovery module 220 and a membership tracker 225. Data store discovery module 210 accesses a shared data store to determine group membership in the peer-to-peer system. Data store discovery module 210 uses shared data store access information 235 to access the shared data store. The shared data store access information 235 may include an address (e.g., a network address) of the shared data store, identification of a protocol to use to access the shared data store (e.g., CIFS, HTTP, NFS, SOAP, etc.), and authentication credentials (e.g., login, password, digital certificates, etc.) for accessing the shared data store. If the shared data store is a network storage device, the address may include a directory of a mapped drive. If the shared data store is a container of a storage cloud, the address may include a universal resource locator (URL).

In one embodiment, data store discovery module 210 writes a network address for its host machine and/or P2P application to the shared data store. Data store discovery module 210 additionally reads network addresses for other nodes in the peer-to-peer system from the shared data store. In one embodiment, data store discovery module 210 downloads one or more membership data structures (e.g., files containing membership lists) from the shared data store. Alternatively, data store discovery module 210 may query the shared data store for network addresses of member nodes. For example, if the shared data store is a database, data store discovery module 210 may query the database using a structured query language (SQL) query. Data store discovery module 210 may generate a membership data structure 240 based on the received network address data. Alternatively, data store discovery module 210 may save a received membership data structure.

In one embodiment, after acquiring the network addresses for the nodes in the peer-to-peer system, the data store discovery module 210 queries one or more of the nodes for their group membership data structures. Data store discovery module 210 may then receive group membership data structures from the nodes and compare the received group membership data structures to the group membership data structure that the data store discovery module 210 previously generated or stored. Data store discovery module 210 may update its group membership data structure 240 based on entries in the received group membership data structures.

In some instances, data store discovery module 210 may not be able to successfully access the shared data store. This may occur, for example, if there is a network partition or if the shared data store has stopped working. In one embodiment, if data store discovery module 210 is unable to perform peer discovery, multicast discovery module 215 and/or static list discovery module 220 perform peer discovery. Multicast discovery module 215 may perform peer discovery using multicast. Static list discovery module 220 may perform peer discovery using a default group membership list 240.

After data store discovery module 210 has performed discovery and joined the P2P system, membership tracker 225 tracks membership of the P2P system and maintains the group membership data structure 240. In one embodiment, membership tracker 225 periodically accesses the shared data store to determine whether network addresses for any new nodes have been added to the shared data store and/or if any network addresses have been removed from the shared data store. This may ensure that P2P system joiner 205 maintains an updated membership view in light of dynamic changes to the P2P system or cluster (e.g., as new peers are added, and existing peers go offline). If new network addresses are included in the shared data store, membership tracker 225 may write those new network addresses to the group membership data structure 240. Alternatively, membership tracker 225 may replace a previous version of the membership data structure 240 with a newly received membership data structure. Therefore, membership tracker 225 ensures that the group membership data structure 240 does not become stale.

The group membership data structure 240 maintained by membership tracker 225 may include every member of the peer-to-peer system, which gives the P2P system joiner 205 a full view of the peer-to-peer system. Alternatively, the group membership data structure 240 may include a subset of the total membership, which provides a partial view of the peer-to-peer system. Note that if the group membership data structure 240 includes a partial view of the total membership in the P2P system, then different P2P system joiners 205 in the peer-to-peer system may have different group membership data structures.

In one embodiment, the peer-to-peer system is divided into multiple clusters. Each cluster may have its own group membership that is maintained in a distinct shared data store. In one embodiment, the P2P system joiner 205 joins a specific cluster of the peer-to-peer system by accessing a specific shared data store associated with that specific cluster.

Figure 3:
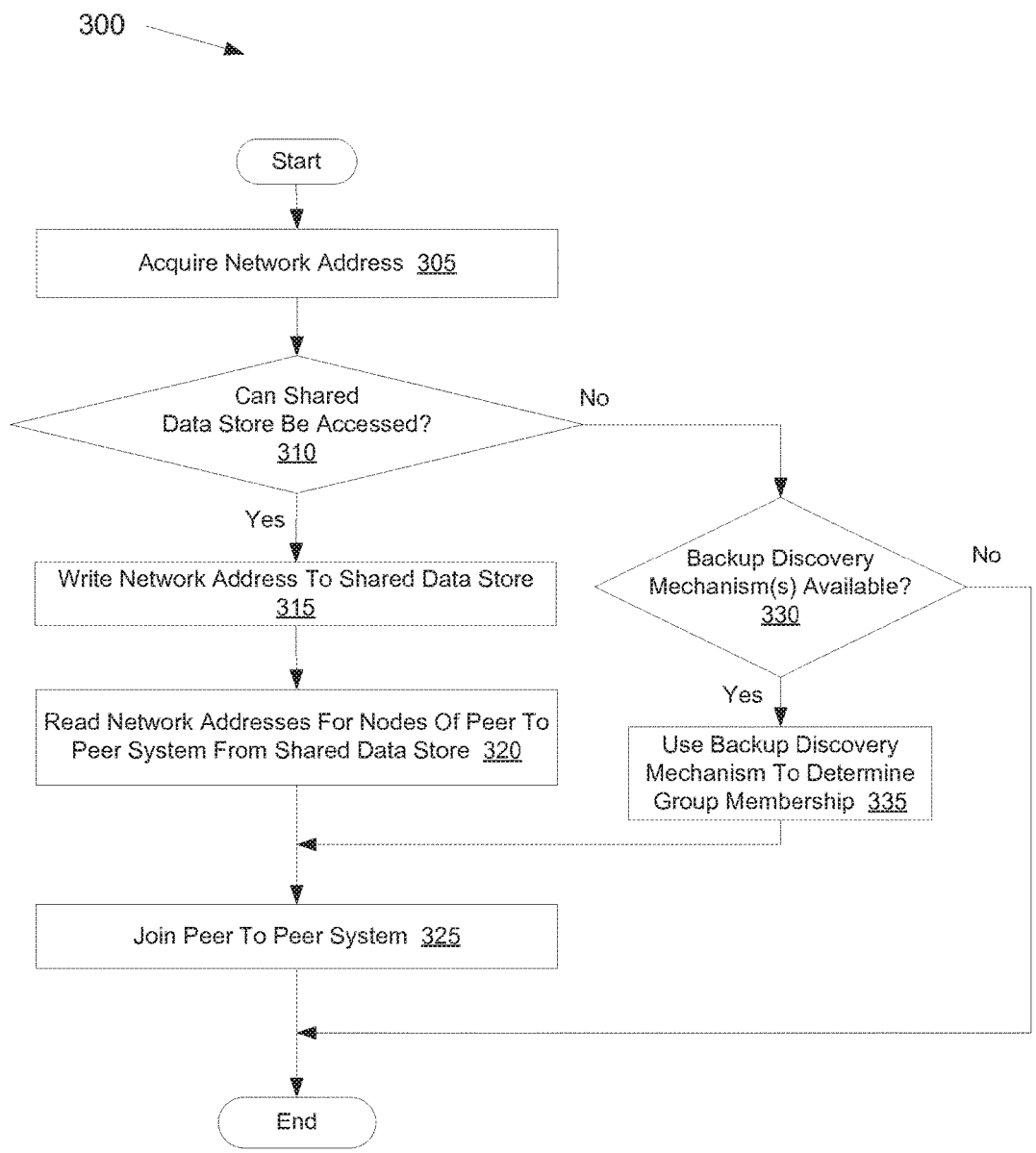
FIG. 3 illustrates a flow diagram of one embodiment for a method of discovering nodes of a peer-to-peer system.

FIG. 3 illustrates a flow diagram of one embodiment for a method 300 of discovering nodes of a peer-to-peer system. The method may be performed by processing logic that may comprise hardware (e.g., circuitry, dedicated logic, programmable logic, microcode, etc.), software (such as instructions run on a processing device), or a combination thereof. In one embodiment, method 300 is performed by a machine that includes a P2P system joiner 125, as shown in FIG. 1.

Referring to FIG. 3, at block 305 processing logic acquires a network address. At block 310, processing logic attempts to access a shared data store. The shared data store may be a directory in a shared network storage device or a container in a storage cloud (e.g., a bucket of Amazon's 83 storage cloud). If the shared data store is a container in a storage cloud, then an HTTP or SOAP message may be sent to the storage cloud to access the shared data store. If the shared data store is a directory in a network storage device, then a CIFS or NFS message may be sent to the network storage device to access the shared data store. In one embodiment, accessing the shared data store includes performing authentication (e.g., by login and password information and/or by providing SSL authentication credentials). If processing logic can access the shared data store, the method continues to block 315. Otherwise, the method continues to block 330.

At block 315, processing logic writes the acquired network address to the shared data store. In one embodiment, processing logic writes the network address to an existing membership data structure in the shared data store. Alternatively, processing logic may generate a new membership data structure and add it to the shared data store.

At block 320, processing logic reads network addresses from the shared data store. This may include downloading one or more membership data structures from the shared data store and/or querying the shared data store. Each read network address may be for a node of a peer-to-peer system. Each such node may be configured to write its network address to the shared data store. Therefore, the shared data store may contain entries for every active node in the peer-to-peer system.

At block 325, processing logic joins the peer-to-peer system. Joining the peer-to-peer system may include communicating with the nodes using their network addresses.

At block 330, processing logic determines whether a backup peer discovery mechanism is available. Examples of backup peer discovery mechanisms include a multicast discovery mechanism and a static list discovery mechanism. If a backup discovery mechanism is available, processing logic uses the backup discovery mechanism to determine group membership for the peer-to-peer system. If no backup peer discovery mechanism is available, processing logic is unable to join the peer-to-peer system, and the method ends.

Figure 4:
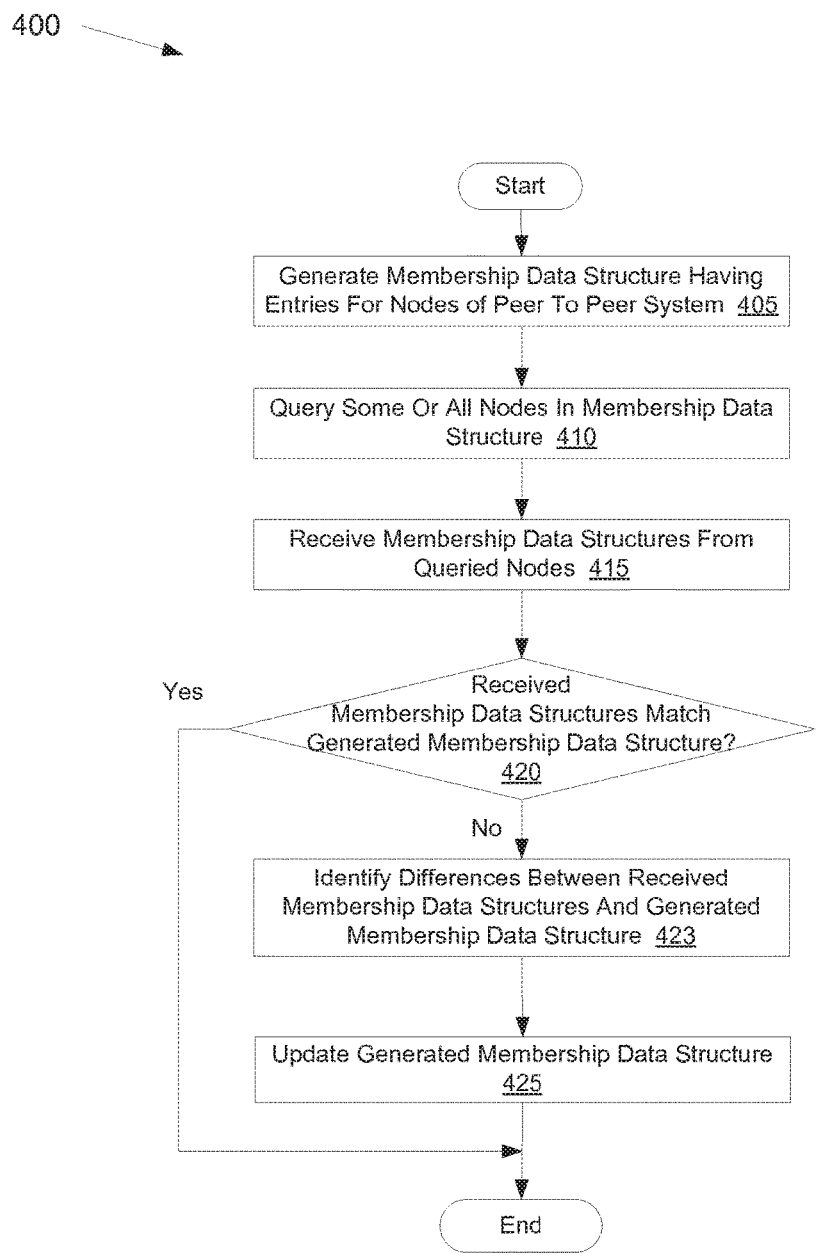
FIG. 4 illustrates a flow diagram of one embodiment for a method of joining a peer-to-peer system.

FIG. 4 illustrates a flow diagram of one embodiment for a method 400 of joining a peer-to-peer system. The method may be performed by processing logic that may comprise hardware (e.g., circuitry, dedicated logic, programmable logic, microcode, etc.), software (such as instructions run on a processing device), or a combination thereof. In one embodiment, method 400 is performed by a machine that includes a P2P system joiner 125, as shown in FIG. 1. In one embodiment, method 400 corresponds to block 325 of method 300.

Referring to FIG. 4, at block 405 processing logic generates and/or stores a membership data structure for a peer-to-peer system. The membership data structure may be a list, table, etc. that includes an entry for each active node of the peer-to-peer system. In one embodiment, the membership data structure is generated based on network addresses retrieved from a shared data store. The generated membership data structure may then be stored. Alternatively, a membership data structure may be received from the shared data store and then stored.

At block 410, processing logic queries some or all of the nodes included in the membership data structure using their network addresses. At block 415, processing logic receives membership data structures from the queried nodes. At block 420, processing logic determines whether the received membership data structures match the stored membership data structure. If any of the received membership data structures fails to match the stored membership data structure, the method continues to block 423. Once processing logic has identified member nodes in the P2P system and notified the member nodes of the network address associated with processing logic's host machine, the processing logic has joined the P2P system.

At block 423, processing logic identifies differences between the received membership data structures and the stored membership data structure. At block 425, processing logic then updates the stored membership data structure. In one embodiment, any network addresses from the received membership data structures that are not in the stored membership structure are added to the stored membership data structure. In one embodiment, network addresses that are in the stored membership data structure but not in the received membership data structure are removed from the stored membership data structure. This ensures that processing logic does not use stale membership information. The method then ends.

Figure 5:
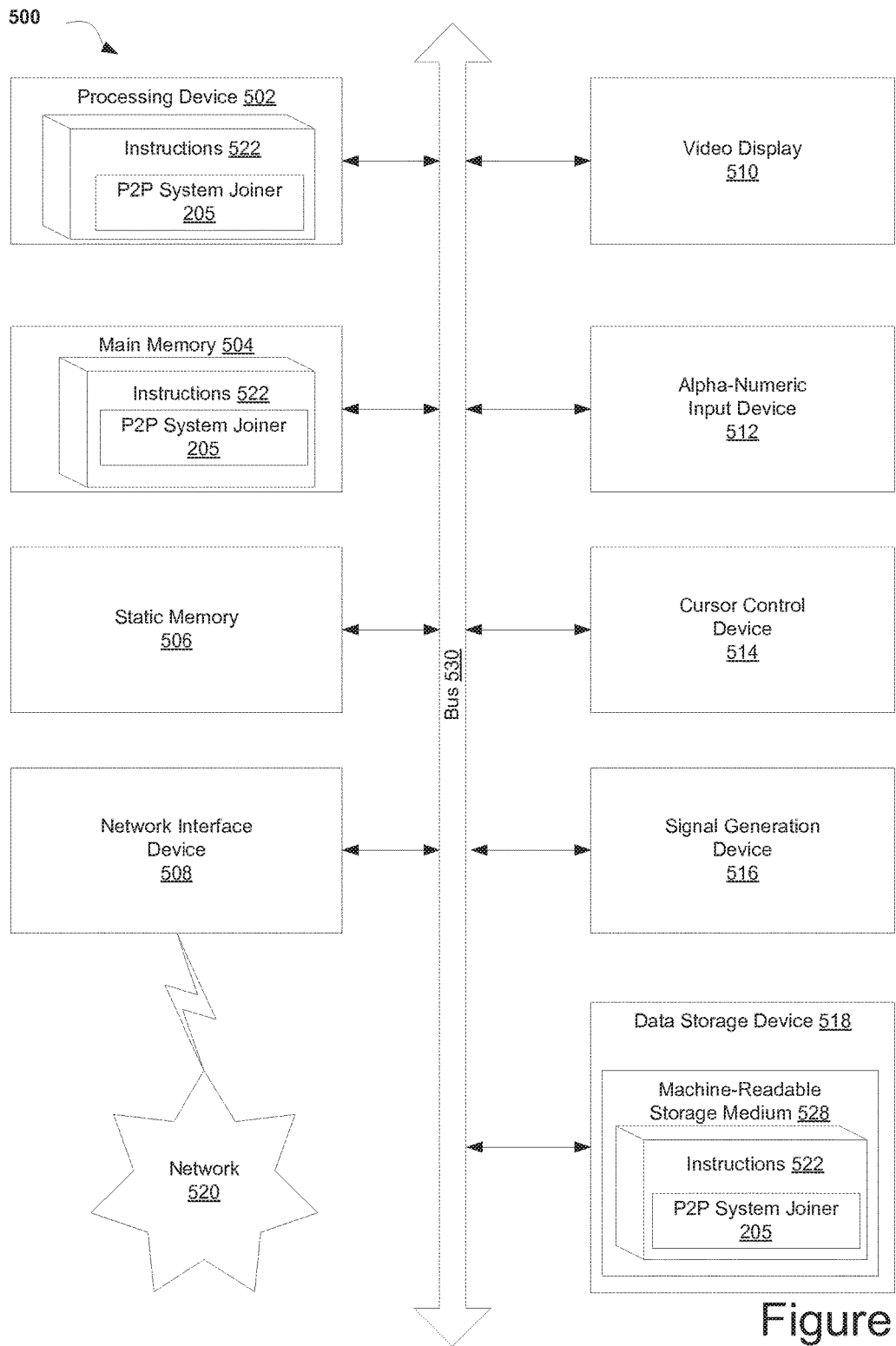
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one embodiment, the instructions 522 include instructions for a P2P system joiner (e.g., P2P system joiner 205 of FIG. 2) and/or a software library containing methods that call a P2P system joiner. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, optical media and magnetic media.

Thus, techniques for using a shared data store for peer discovery in a peer-to-peer system are described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "acquiring" or "writing" or "reading" or "joining" or "querying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CO-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method, comprising:
    identifying, by a processing device of a new node, an address of a shared data store storing information on a current membership in a peer-to-peer system, wherein the shared data store is shared by a plurality of nodes that are current members of the peer-to-peer system, wherein the shared data store is a container for storing data in a storage cloud;
    sending, by the new node, a first message comprising an address of the new node to the shared data store;
    requesting, by the new node, at least one membership data structure from the shared data store;
    receiving, by the new node, a second message comprising the at least one membership data structure;
    generating, by the new node, a new membership data structure comprising the address of the new node and the plurality of addresses of the plurality of nodes identified in the at least one membership data structure;
    sending, by the new node, a third message comprising the new membership data structure to the shared data store; and
    joining, by the new node, the peer-to-peer system, wherein the joining comprises using the new membership data structure to identify nodes of the plurality of nodes to receive a plurality of messages from the new node.

2. The method of claim 1, wherein the address of the shared data store comprises a Uniform Resource Locator (URL).

3. The method of claim 1, wherein the plurality of messages comprises the address of the new node.

4. The method of claim 1, wherein the container is provided by one of: Amazon® Simple Storage Service (S3), Nirvanix® Storage Delivery Network (SDN), Windows® Live SkyDrive, Ironmountain® storage cloud, Rackspace® Cloudfiles, AT&T® Synaptic Storage as a Service, Zetta® Enterprise Cloud Storage On Demand, IBM® Smart Business Storage Cloud, or Mosso® Cloud Files.

5. The method of claim 1, further comprising:
    querying the shared data store to determine whether an address of an additional new node has been added to the shared data store; and
    updating the membership data structure to include the address of the additional new node.

6. The method of claim 1, further comprising:
    querying a node of the plurality of nodes for an additional membership data structure maintained by the node; and
    updating the membership data structure using the additional membership data structure.

7. The method of claim 1, further comprising:
    multicasting the address of the new node on the network; and
    receiving the plurality of addresses from the plurality of nodes in response to multicasting the address of the new node.

8. A non-transitory computer readable medium comprising instructions that, when executed by a processing device of a new node, cause the processing device to:
    identify, by the new node, an address of a shared data store storing information on a current membership in a peer-to-peer system, wherein the shared data store is shared by a plurality of nodes that are current members of the peer-to-peer system, wherein the shared data store is a container for storing data in a storage cloud;
    send, by the new node, a first message comprising an address of the new node to the shared data store;
    request, by the new node, at least one membership data structure from the shared data store;
    receive, by the new node, a second message comprising the at least one membership data structure;
    generate, by the new node, a new membership data structure comprising the address of the new node and the plurality of addresses of the plurality of nodes identified in the at least one membership data structure;
    send, by the new node, a third message comprising the new membership data structure to the shared data store; and
    join, by the new node, the peer-to-peer system, wherein the joining comprises using the new membership data structure to identify nodes of the plurality of nodes to receive a plurality of messages from the new node.

9. The non-transitory computer readable medium of claim 8, wherein the address of the shared data store comprises a Uniform Resource Locator (URL).

10. The non-transitory computer readable medium of claim 8, wherein the plurality of messages comprises the address of the new node.

11. The non-transitory computer readable medium of claim 8, wherein the container is provided by one of: Amazon® Simple Storage Service (S3), Nirvanix® Storage Delivery Network (SDN), Windows® Live SkyDrive, Ironmountain® storage cloud, Rackspace® Cloudfiles, AT&T® Synaptic Storage as a Service, Zetta® Enterprise Cloud Storage On Demand, IBM® Smart Business Storage Cloud, or Mosso® Cloud Files.

12. The non-transitory computer readable medium of claim 8, further comprising executable instructions to cause the processing device to:
query the shared data store to determine whether an address of an additional new node has been added to the shared data store; and
update the membership data structure to include the address of the additional new node.

13. The non-transitory computer readable medium of claim 8, further comprising executable instructions to cause the processing device to:
query a node of the plurality of nodes for an additional membership data structure maintained by the node; and
update the membership data structure using the additional membership data structure.

14. The non-transitory computer readable medium of claim 8, further comprising executable instructions to cause the processing device to:
multicast the address of the new node on the network; and
receive the plurality of addresses from the plurality of nodes in response to multicasting the address of the new node.

15. A computing device for a new node comprising:
a memory; and
a processing device operatively coupled to the memory to:
identify, by the new node, an address of a shared data store storing information on a current membership in a peer-to-peer system, wherein the shared data store is shared by a plurality of nodes that are current members of the peer-to-peer system, wherein the shared data store is a container for storing data in a storage cloud;
send, by the new node, a first message comprising an address of the new node to the shared data store;
request, by the new node, at least one membership data structure from the shared data store;
receive, by the new node, a second message comprising the at least one membership data structure;
generate, by the new node, a new membership data structure comprising the address of the new node and the plurality of addresses of the plurality of nodes identified in the at least one membership data structure;
send, by the new node, a third message comprising the new membership data structure to the shared data store; and
join, by the new node, the peer-to-peer system, wherein the joining comprises using the new membership data structure to identify nodes of the plurality of nodes to receive a plurality of messages from the new node.

16. The computing device of claim 15, wherein the address of the shared data store comprises a Uniform Resource Locator (URL).

17. The computing device of claim 15, wherein the plurality of messages comprises the address of the new node.

18. The computing device of claim 15, wherein the container is provided by one of: Amazon® Simple Storage Service (S3), Nirvanix® Storage Delivery Network (SDN), Windows® Live SkyDrive, Ironmountain® storage cloud, Rackspace® Cloudfiles, AT&T® Synaptic Storage as a Service, Zetta® Enterprise Cloud Storage On Demand, IBM® Smart Business Storage Cloud, or Mosso® Cloud Files.

19. The computing device of claim 15, wherein the processing device is further to:
querying the shared data store to determine whether an address of an additional new node has been added to the shared data store; and
updating the membership data structure to include the address of the additional new node.

20. The computing device of claim 15, wherein the processing device is further to:
querying a node of the plurality of nodes for an additional membership data structure maintained by the node; and
updating the membership data structure using the additional membership data structure.

* * * * *